US009515754B2

(12) United States Patent
Kirkendall-Rodriguez et al.

(10) Patent No.: US 9,515,754 B2
(45) Date of Patent: Dec. 6, 2016

(54) MEASURING AUDIENCE REACTION

(75) Inventors: Brice Kirkendall-Rodriguez, New York, NY (US); Philippe Generali, Scarsdale, NY (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 786 days.

(21) Appl. No.: 12/631,551

(22) Filed: Dec. 4, 2009

(65) Prior Publication Data
US 2010/0110079 A1  May 6, 2010

Related U.S. Application Data

(63) Continuation-in-part of application No. 12/539,885, filed on Aug. 12, 2009.

(60) Provisional application No. 61/193,515, filed on Dec. 4, 2008, provisional application No. 61/136,092, filed on Aug. 12, 2008, provisional application No. 61/193,516, filed on Dec. 4, 2008.

(51) Int. Cl.
*H04H 60/33* (2008.01)
*H04H 60/32* (2008.01)
*H04H 60/44* (2008.01)
*G06Q 30/02* (2012.01)
*H04H 60/31* (2008.01)
*H04N 21/24* (2011.01)
*H04H 60/46* (2008.01)

(52) U.S. Cl.
CPC .......... *H04H 60/44* (2013.01); *G06Q 30/0204* (2013.01); *H04H 60/31* (2013.01); *H04H 60/33* (2013.01); *H04H 60/46* (2013.01); *H04N 21/24* (2013.01); *H04N 21/2407* (2013.01)

(58) Field of Classification Search
CPC .......................... H04N 21/24; H04N 21/2407
USPC ...................................................... 725/9, 16
See application file for complete search history.

(56) References Cited

U.S. PATENT DOCUMENTS

| | | | |
|---|---|---|---|
| 6,295,092 B1 | 9/2001 | Hullinger et al. | |
| 7,239,981 B2 | 7/2007 | Kolessar et al. | |
| 2002/0056087 A1* | 5/2002 | Berezowski et al. | 725/9 |
| 2002/0194585 A1 | 12/2002 | Connelly | |

(Continued)

FOREIGN PATENT DOCUMENTS

| | | |
|---|---|---|
| WO | WO2004012121 | 2/2004 |
| WO | WO2005094325 | 10/2005 |

*Primary Examiner* — Michael Hong
(74) *Attorney, Agent, or Firm* — Garlick & Markison; Edward J. Marshall

(57) ABSTRACT

Audience migration information can include information about audience members who tuned to, or away from, a station at particular times, and can suggest a rate of change in the average number of audience members over a first time period, and a rate of change in the number of audience members over a second period. Normalized audience migration information, which can indicate a difference between the two rates of change can be generated and used as one of multiple graph plots. The normalized audience migration information can be generated at a server, at a networked computer running a browser, or the like. A graphical user interface (GUI) can be used to display a graphical representation of the audience migration information. Additional panes tied to the content displayed in the graphical representation can also be displayed in the GUI.

13 Claims, 9 Drawing Sheets

(56) References Cited

U.S. PATENT DOCUMENTS

| | | |
|---|---|---|
| 2003/0037333 A1 | 2/2003 | Ghashghai et al. |
| 2006/0075421 A1* | 4/2006 | Roberts et al. ............... 725/9 |
| 2007/0162923 A1* | 7/2007 | Silveira Da Motta .......... 725/14 |
| 2009/0055862 A1* | 2/2009 | Knoller et al. ................. 725/34 |

\* cited by examiner

MEASURING AUDIENCE REACTION

RELATED APPLICATIONS

This application is a continuation-in-part of co-pending U.S. application Ser. No. 12/539,885, entitled, "Determining Audience Response To Broadcast Content," filed Aug. 12, 2009, which claims benefit to the filing date of U.S. Provisional Application No. 61/193,515, entitled, "Method and System for Analyzing Program Audience Reaction," filed Dec. 4, 2008; and U.S. Provisional Application No. 61/136,092, entitled, "Method and System for Analyzing and Trending Audience Switching," filed Aug. 12, 2008; and claims benefit to the filing date of U.S. Provisional Application No. 61/193,516, entitled, "Method and System for Measuring Audience Reaction," filed Dec. 4, 2008. Each of the listed applications is hereby incorporated by reference in its entirety.

FIELD

The present disclosure relates generally to using data related to media audiences, and more particularly to measuring and presenting audience reactions to particular media content.

BACKGROUND

Audience demographics and consumption habits are frequently used by broadcast content providers and media stations in industries such as terrestrial and satellite radio, cable, Internet, cellular telephone and other wireless communications, newspapers, billboards, and the like. Media stations are often rated or ranked based on audience membership, listener-ship, viewer-ship, webpage hits, and the like. A greater number of audience members generally results in a higher rating, and potentially greater advertising revenue. This type of information is available from a variety of conventional sources. Arbitron, for example, collects audience exposure data and provides it in various formats, including "Portable People Meter" (PPM) data.

Information about which media programs are broadcast on particular stations at particular times is also used by content providers for various purposes. For example, data related to broadcast content can help evaluate a station's compliance with advertising programs and broadcast schedules. Data identifying stations on which a particular media program was broadcast, and corresponding broadcast times, is available from sources such as Media Monitors, which collects audio from various media stations using field sites in major markets.

Various statistical techniques are commonly used to evaluate available data. However, currently employed evaluation techniques do not take into account all of the possible ways data from various different sources can be usefully combined, evaluated, and presented.

SUMMARY

Audience migration information can include information about audience members who tuned to, or away from, a station at particular times, and can suggest or indicate an average number of audience members over a first time period, a rate of change in the average number of audience members over a first time period, a number of audience members over a second period, and a rate of change in the number of audience members over a second period. Normalized audience migration information, which can indicate a difference between the two rates of change, can be generated and used as one of multiple graph plots. A graphical user interface (GUI) can be used to present the audience migration information in various forms.

A method according to at least one embodiment includes obtaining first audience migration information suggesting a rate of change in a number of audience members over an first interval of time; obtaining second audience migration information indicating a rate of change in an average number of audience members over a second interval of time; and generating normalized audience migration information indicating a difference between the first audience migration information and the second audience migration information.

In some embodiments, the normalized audience migration information can be generated at a data server, a web server, or another suitable server or computer system. In other embodiments, first audience migration information and the second audience migration information can be transmitted to a networked computer system, where the normalized audience migration information can be generated using, for example, a browser program.

A method according to some embodiments includes obtaining audience migration information, and displaying a graphical representation of at least a portion of the audience migration information. The audience migration information in some such embodiments includes first information indicating a number of audience members who tuned to a station during an interval of time, and second information indicating a number of audience members who tuned-away from the station during that same interval of time. Displaying a graphical representation can include displaying a graph that includes a first plot representing the number of audience members who tuned to a station, a second plot representing the number of audience members who tuned away from the station, and a third plot representing a number of audience members.

Some embodiments also include displaying informational panes in conjunction with the graphical representation. For example, an audience migration pane, a media log pane, or various other panes and display areas can be displayed in conjunction with the graphical representation. Some or all of the elements of various methods disclosed herein can be performed by executing a program instruction in a computer system.

Various embodiments can take the form of a graphical user interface (GUI) that includes a display area configured to display a first graphical representation of at least a portion of available audience migration information, and one or more user selectable objects configured to reconfigure the display area upon activation. The display area can be reconfigured to display a second graphical representation of at least a portion of available audience migration information.

The display area of the GUI can be configured to display a graph including a first plot representing a number of audience members who tuned to a station, a second plot representing a number of audience members who tuned away from the station, and a third plot representing a number of audience members. In some instances, the GUI can include additional panes, displays, and input areas tied to the data presented in the graphical representation of the audience migration information.

A system in which various embodiments of the present disclosure can be implemented includes a processor, memory associated with the processor, and a program of instructions to be stored in the memory and executed by the processor. The program of instructions can include at least one instruction to obtain audience migration information, and at least one instruction to display a graphical representation of at least a portion of the audience migration information.

Some embodiments also include at least one instruction to display a graph including a first plot representing the number of audience members who tuned to a station, a second plot representing the number of audience members who tuned away from the station, and a third plot representing a number of audience members. Instructions to display an audience migration pane in conjunction with the graphical representation, and a media log pane in conjunction with the graphical representation can also.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

Described herein are various methods and systems that can be used for audience recognition trending, e.g. measuring and evaluating audience reactions and responses to broadcast media content. Embodiments can utilize an audience reaction or response process to analyze audience data (e.g., PPM data or Nielson data) and airplay information (e.g., Media Monitors airplay information) at the same time. The term "media," as used herein can refer to radio, TV, internet, billboard, print-media, cellular, WiFi, WiMAX, and other sources associated with distribution of events, content, advertising, etc. delivered via a variety of distribution technologies, including without limitation analog, FM, HD, and digital data technologies, print media, billboards, etc.

An audience reaction process can allow a user to hear, e.g., on-air or on-net output, and at the same time observe changes in the audience. The audience reaction process can also allow a user to compare listening/viewing, minute by minute, for a selected day, with any other day or days for which airplay information is available for the selected market. A user can also view, again on a minute by minute basis, how many audience members are tuning in or tuning out (audience migration) and view plots of audience migration information against average audience figures for the selected day or other time period.

In some embodiments, a user can also view the content (e.g., song or spot) being played on the station, channel, website, etc. for the selected minute in a media log pane at the bottom of a window included in a graphical user interface (GUI). The user can also play back content (e.g., audio) for the station output and correlate this with Audience Reaction and Audience Migration figures. In some embodiments, the Audience Reaction process can be accessed by a user activating a drop down menu or other user selectable object in a Navigation Bar.

Figure 1:
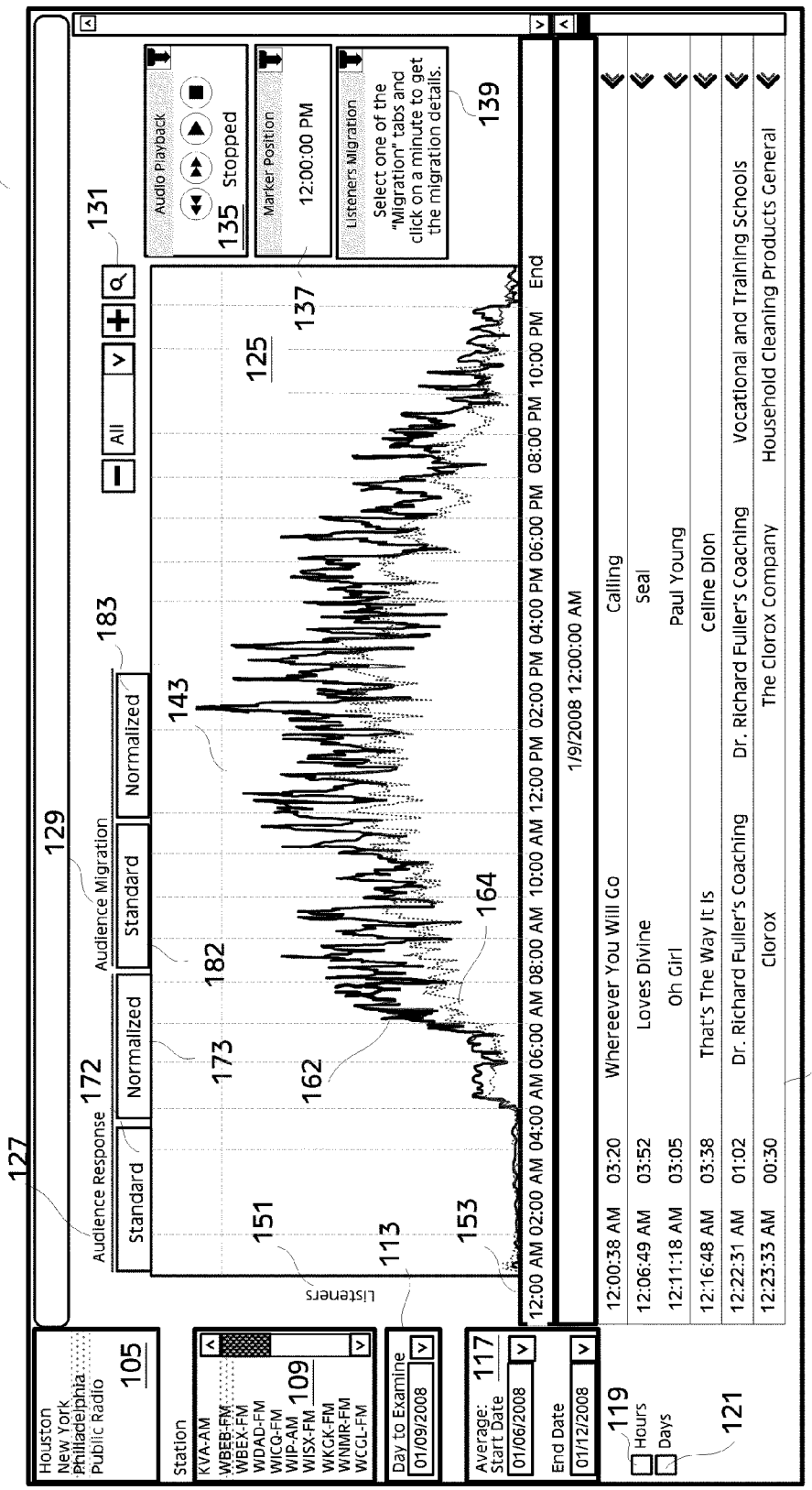
FIGS. 1 and 2 are example of Graphical User Interfaces (GUIs) displaying audience response and migration information according to embodiments of the present disclosure.

Referring first to FIG. 1, a screen shot of a graphical user interface (GUI) 100 according to various embodiments will be discussed. GUI 100 can include markets pane 105; stations pane 109; day to examine pane 113; average date range pane 117; hours checkbox 119; days checkbox 121; graphical representation area 125; audience response selector 127; audience migration selector 129; zoom control 131; playback control pane 135; marker position time field 137; audience migration pane 139; and media log pane 141. Various embodiments include additional or fewer panes and user selectable objects. According to some embodiments, one or more of the various panes can be positioned as desired within GUI 100, and can even be positioned partially or fully superimposed on graphical representation area 125 and other display areas and panes.

In various embodiments, markets pane 105 is a user selectable object, such as a list box, a drop down box, or the like, that includes a listing of markets where an Audience Reaction service is available. Markets pane 105 can be activated, for example by clicking, double clicking, or otherwise choosing one of the available markets for which information is to be displayed on GUI 100.

Stations pane 109 can be a user selectable object, such as a list box, a drop down box, or the like, that includes a listing of available radio or other media stations in the market indicated by market pane 105. A desired media station can be selected by a user of GUI 100 to display information associated with that radio station. In some embodiments, when stations pane 109 is utilized to select a desired station, GUI 100 opens a new window or pane (not illustrated) showing dates for which audience data is available for the selected station. In some embodiments, when manually selecting a date range, the selected start and end dates should both fall on days for which audience data is available, otherwise a warning can be displayed and searching may be disallowed.

In various embodiments, day to examine pane 113 and average date range pane 117 can be used to select data to be displayed in the graphical representation area 125. When selecting a day to examine from day to examine pane 113, or a date range from date range pane 117, the selected start and end dates should both fall on days for which audience data is available, otherwise a warning can be displayed and searching can be disallowed.

Some embodiments described herein display two or more plots in graphical representation area 125. For example, when selecting a day to examine, a plot 162 representing data from the selected day can be displayed in graphical representation area 125. A comparison period can also be selected, with average data for the selected comparison period being displayed as plot 164. In some embodiments, the default comparison period can be five workdays, a full week, or another suitable period of time.

When a weekday is selected from day to examine pane 113, some embodiments will propose a comparison period of all weekdays for the week of the selected weekday, subject to audience data being available for those dates. If a weekend date is selected, some embodiments will propose the week previous to the selected weekend, e.g. from the Monday prior to the selected weekend through the Sunday of the selected weekend, subject to audience data being available.

A user can, in some instances, manually override the default suggestion, and select a shorter or longer period that may or may not coincide with the selected day. For example, a user might wish to do a quarter on quarter comparison. Note that in some embodiments if a user selects a period of less than five days, GUI 100 can display a date range warning or confirmation box (not illustrated).

Hours checkbox 119 can be utilized to allow the user to select and define hour ranges to filter information displayed in other portions of GUI 100, including graphical representation area 125. Similarly, days checkbox 121 can be utilized to allow a user to select and define day range filters.

Graphical representation area 125 can be used to present various graphical representations of audience reaction and migration data, including various charts, graphs, and other visual, auditory, or combined visual and auditory representations. In some embodiments, the graphical representation area 125 can be used to display audience reaction and migration data in either a standard or normalized form.

A graph according to at least one embodiment plots number of listeners 151 on the y axis of the graph against time 153 on the x axis. In some embodiments, a user can be prompted to select a time along the x axis by positioning a marker, such as time marker 143, at a position corresponding to a time of interest.

When the audience response standard tab 172 is selected, some embodiments display two overlaid plots. One plot 162 can be a solid line representing the number of sample listeners who were tuned in for the selected minute of the day specified in the day to examine pane 113. The second plot 164 can be a dashed line representing the average number of sample listeners who were tuned in over the range indicated in date range pane 117. When audience response normalized tab 173 is selected, two or more plots (not illustrated) indicating deviations occurring on the selected day from period averages can be displayed.

Figure 2:
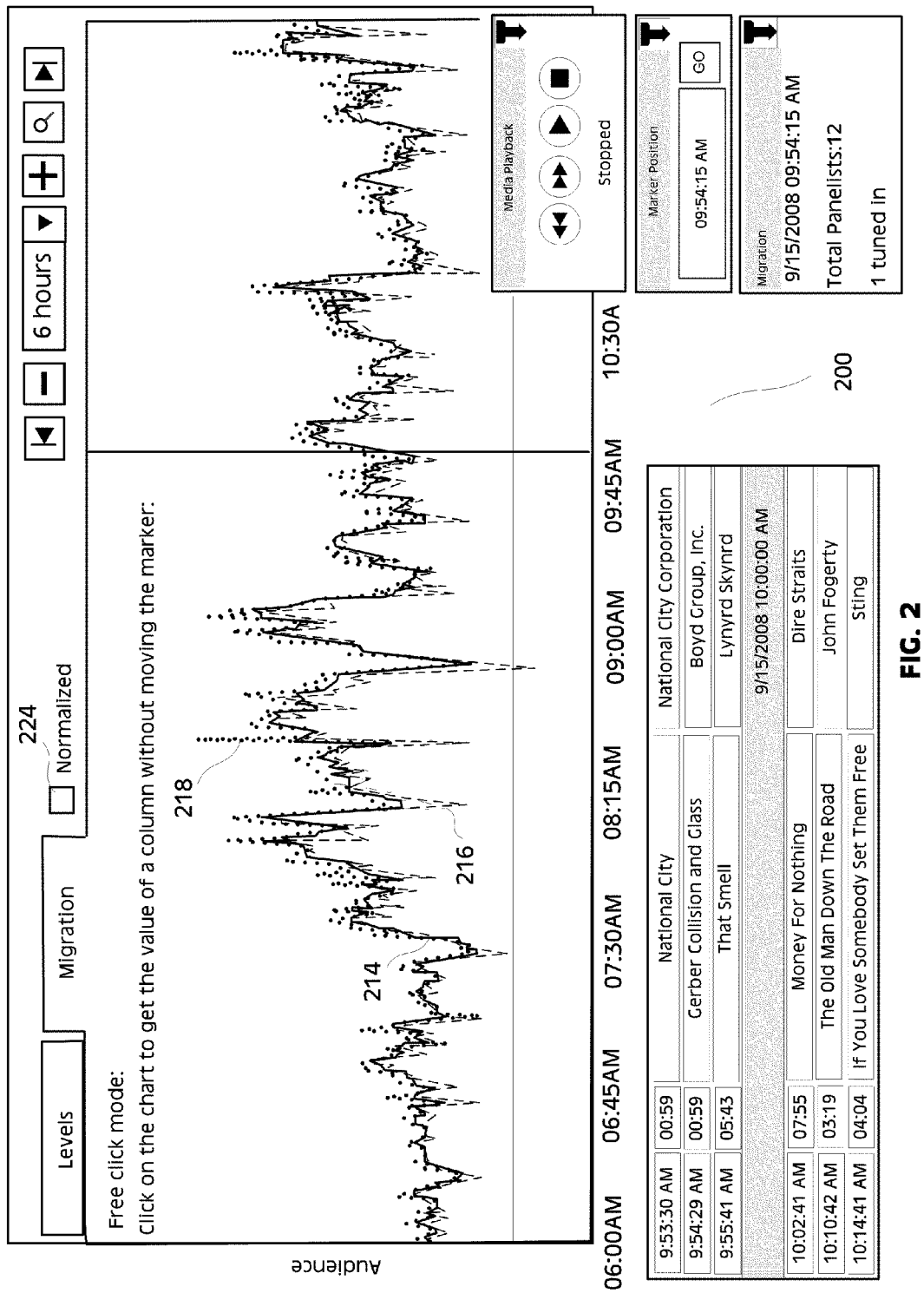

Audience migration standard tab 182 can be used to track listeners tuning in and out of a station. Referring briefly to FIG. 2, in at least some embodiments, three overlaid plots are used to display audience migration information. For example, the solid dark line 214 can be used to represent the number of sample listeners tuned in at the selected minute of the day specified in the day to examine pane 113 (see FIG. 1); the medium dashed line 216 can be used to represent the number of individual sample listeners who tuned in to the station during the selected minute; and light dashed line 218 can be used to represent the number of individual sample listeners who tuned away from the station during that minute.

In some embodiments, when the normalized checkbox 224 is selected, or when the normalized audience migration tab 183 (see FIG. 1) is selected, a graph presented in graphical representation area 125 (see FIG. 1) can include two overlaid plots (not illustrated), presented as bars or otherwise, with one plot representing a difference between the solid dark line 214 and medium dashed line 216, and the other representing a difference between the solid dark line 214 and light dashed line 218.

Referring again to FIG. 1, zoom control 131 can be utilized to allow a user to specify the hours on display in graphical representation area 125. In some embodiments, a user can display a time span from 1 hour up to a full day.

Playback control pane 135 can be utilized to allow a user to play audio or other relevant media starting from a selected time. A user can also pause, stop, jump forward and back, and perform other playback functions. In at least some embodiments, playback of audio or other media content can be continuous. Various embodiments allow access to audio or other media up to 90 days after it was recorded.

Marker position pane 137 can be used to change the position of time marker 143. In some embodiments, marker position pane 137 and the media log pane 141 automatically update when a user changes the position of time marker 143, which can be accomplished by dragging time marker 143 to a new position, or by clicking on a desired location of a graph displayed in the graphical representation area 125.

Audience migration pane 139 can be used to display audience figures and migration information for a selected time. For example, audience migration pane 139 can be used to display the number of audience members who tuned in or tuned away from a station at a particular time. It can also be used to display an audience sample size, an average number of audience members, or other information related to audience migration or trends in audience migration. In at least one embodiment, the content displayed in audience migration pane 139 changes along with a change in the position of time marker 143.

Media log pane 141 can be used to display, for a selected day, content played on a particular station. In some embodiments, media log pane 141 can display up to 24 hours of output. Various embodiments display 24 hours of data starting from midnight on a selected date, irrespective of particular hours that may be selected for display in graphical representation area 125. In at least one embodiment, media log pane 141 automatically updates to show the selected song or ad playing at the time point displayed in marker position pane 137, which generally coincides with the position of time marker 143.

In some embodiments when working in the graphical representation area 125, a user has several selection options. A user may, for example, click on a plot or in some instances anywhere in graphical representation area 125 to select a time to the nearest minute. Some embodiments described herein reposition to the selected minute, and automatically update to show the item being played in the Media Log pane, and display values for graph plots. In some embodiments, GUI 100 will temporarily display a time of day, a day value, and an average value in response to the user clicking on a portion of a plot.

In some embodiments, a user of GUI 100 can click and drag to select a time range. Additionally, GUI 100 can display average values for each plot over the selected time range. Various embodiments also provide for a precise positioning mode, and a free click mode. In the precise positioning mode, a user can press the shift key, and then click and drag with a pointing device to position a cursor to the nearest second. In a free click mode, a user can press the Ctrl key to be able to select any point in the graphical representation area 125 to view values for that point, without losing cursor position.

Figure 3:
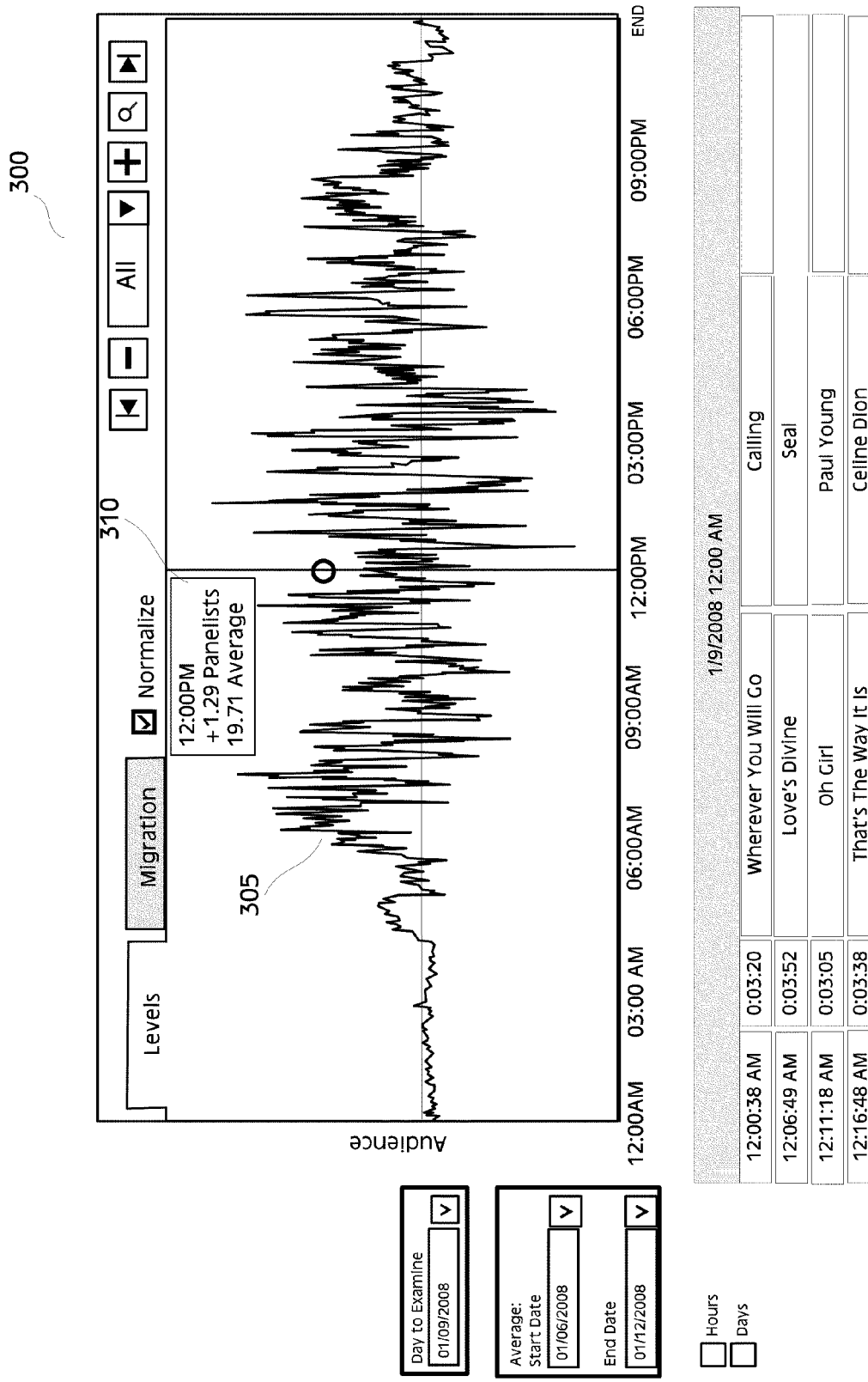
FIG. 3. is a graphical display area of a GUI displaying a normalized view for the same data rendered in FIG. 1, according to embodiments of the present disclosure.

Referring next to FIG. 3 an example of a graph 300 displaying normalized audience migration information will be discussed according to various embodiments. In at least one embodiment, normalized audience migration plot 305 represents a difference between the average number of audience members over a first time period and the number of audience members over a period of interest. In the example illustrated in FIG. 3, normalized audience migration plot 305 shows that from 12:00 pm to 12:01 pm on Jan. 9, 2008, there were 1.29 more audience members than the average number of audience members during that same period of time on each day between Jan. 6, 2008 and Jan. 12, 2008. The normalized graph values, along with other information such as the average number of audience members, can be displayed in data pop-up 310, even if some of the information in pop-up 310 is not presented as a graph plot. In some embodiments, the average number of audience members over a period of time can suggest a rate of change in the average number of audience members. Likewise, the rate of change in the number of audience members over a period of time selected for comparison can suggest a rate of change in the number of audience members over that period of time.

Figure 4:
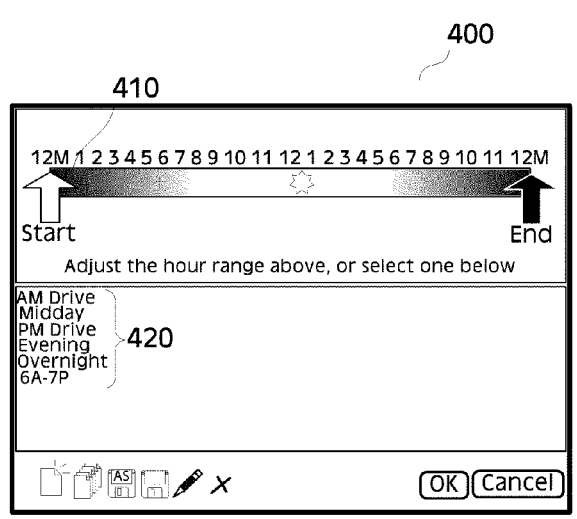
FIG. 4 is a screen shot of a range selection pane according to embodiments of the present disclosure.

With reference now to FIG. 4, an example of a filter pane 400 is illustrated according to various embodiments of the present disclosure. Filter pane 400 can be displayed partially or fully overlaying a graph or other object in graphical representation area, in a tiled pane not overlapping other displayed objects, or otherwise. Filter pane 400 can be utilized to facilitate selection of hour ranges for data displayed in a graph or other object displayed on a GUI. In some embodiments, for example, slider 410 can be used to select desired hours for display in a corresponding graph or other display pane. In other embodiments, a list of dayparts 420 can be displayed, allowing a user to choose data from the morning drive for display and analysis.

Figure 5:
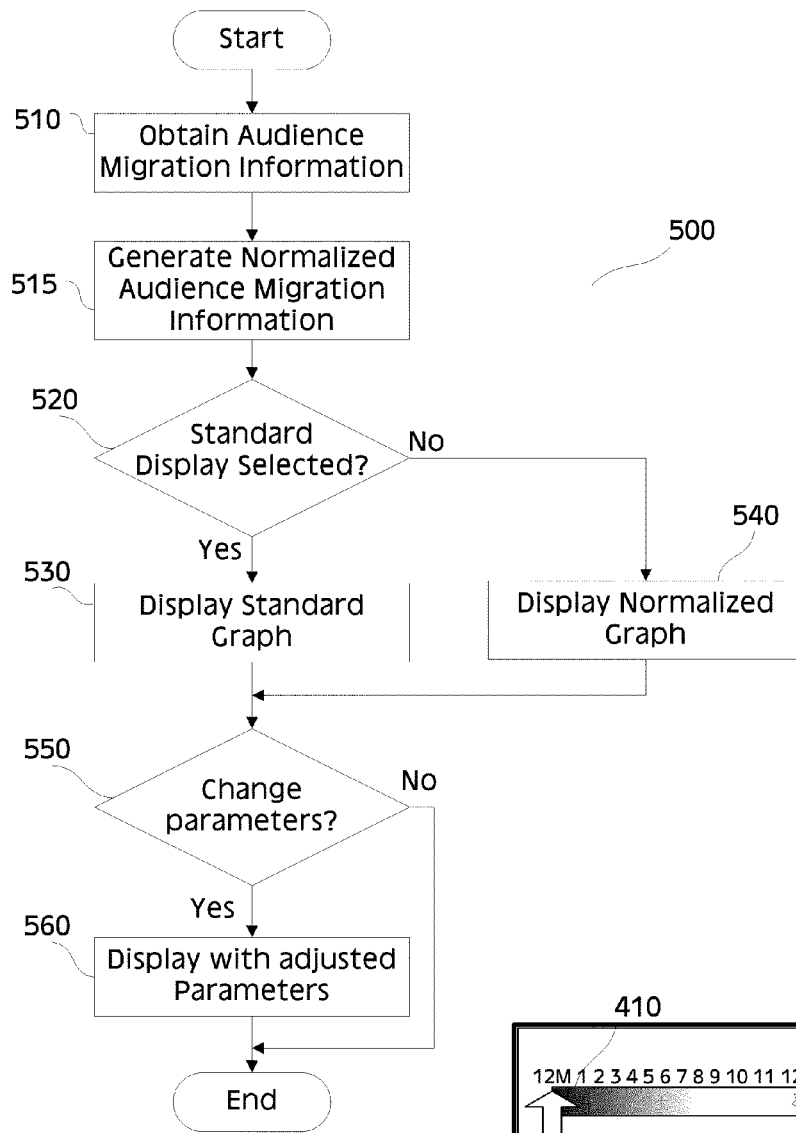
FIG. 5 is a flow chart illustrating a method of obtaining and displaying audience migration information.

Referring next to FIG. 5, a method 500 according to some embodiments is discussed. As illustrated by block 510, audience migration information is obtained. In some embodiments, the audience migration information can be obtained from a local or remote database, which can be accessed by any of various methods, including but not limited to Internet web sites. Audience migration information can include ratings and audience data from multiple different providers, such as Arbitron and Media Monitors, station logs from one or more stations, and other related information. Obtaining information can include obtaining fully processed information, partially process information, or raw data. If data is obtained before audience migration information has been determined, for example if raw data from one or more sources is received at a server or other device, some embodiments can process the raw data to determine, e.g. how many audience members have tuned away or tuned to a particular station at a given time. Various methods for processing the audience migration information are discussed subsequently with respect to FIGS. 6-9.

In some embodiments, more completely processed information can also be received by a server, device, or other computational system implementing various methods discussed herein. In some instances, fully processed information includes audience migration information that has already been processed to determine values to be plotted on a graph, although processing for display purposes may still be required. Some such embodiments allow a central or distributed server or system to perform the bulk of the calculations, while allowing users at remote terminals to access and display the data according to desired parameters. In various embodiments, audience migration information includes information related to broadcast content, including information that allows a user to retrieve previously broadcast audio or video content using a traditional log format, and to play back the broadcast content as desired.

As illustrated by block 515, normalized audience migration information can be generated at a data server, a web server, or on a networked machine. In some embodiments, normalized audience migration information indicates a difference between a rate of change in the average number of audience members over one period of time and a rate of change in the number of audience members over another period of time. For example, the change in the average number of audience members from 8:00 am to 9:00 am on a normal weekday is 40, and the change in the average number of audience members from 8:00 am to 9:00 am on a day of interest is 25, in at least one embodiment the normalized audience migration information would indicate a difference of 15. In various embodiments, different time periods ranging from seconds to hours, days, or even longer periods, can be used for comparison.

In some embodiments, some or all of the audience migration data can be calculated by one or more servers before being delivered to an end-user's machine for display. The audience migration information can be obtained by the end-user's machine and used to generate normalized audience migration information, which can then be displayed as a graph plot on a GUI, or otherwise. In at least one embodiment, information used to generate the normalized audience migration information is transmitted to the end-user's machine using an protocol compatible with a web browser, for example Extensible Markup Language (XML), Hypertext Markup Language (HTML), or the like. Further embodiments can deliver data used to calculate the audience migration data to the end-user's machine.

As illustrated by block 520, a check can be made to determine which type of display a user desires. In some embodiments, a GUI is used to display one or more areas, display panes, and other user selectable objects through which a user can indicate his preferences. Examples of various input panes and objects have been previously discussed. In some embodiments, a user can select to display a standard graph, a normalized graph, or any number of other graphical representations of the audience migration information, over any of various periods of time.

As illustrated by block 530, if a standard type of audience migration graph is selected, a GUI can be used to display the standard graph in a graphical display area, such as a graph pane, or the like. A standard graph of audience migration information can include one or more different plots representing different aspects of the audience migration information. In at least one embodiment, a graph having three different plots representing different aspects of the audience migration information can be presented. One of the plots can be used to represent the number of audience members who tuned to a station during a particular period of time. Another of the plots can be used to represent the number of audience members who tuned away from the station during that same period of time.

A third plot representing a sample number of audience members can also be displayed. The plot representing a sample number of audience members can represent the number of audience members at the beginning of the time period in question, at the end of the time period, during a middle of the time period in question, or otherwise. For example, the sample number of audience members can, in some instances, represent an average number, a mean, or another desired statistical value.

As illustrated by block 540, if a standard graph display is not selected, a normalized graph can be displayed. As used herein, the term "normalized" is used in a broad sense, and is not intended to limit the disclosure to a rigid statistical definition, although some embodiments can be used to generate normalized graphs within the strictest statistical definition.

In some embodiments, a displaying a normalized graph can include displaying a graph that includes at least two plots, one of which can represent a relationship between the number of audience members who tuned to a station during a period of time and a total or sample number of audience members. The second of the two plots can represent a relationship between the number of audience members who tuned away from the station during that same period of time and the total or sample number of audience members. These plots can be presented as the only two plotted lines on a line graph, or can be lines, bars, graphical regions, or other plots overlaid onto a standard graph or other graphical representation.

In some embodiments, a normalized graph with two plots can be presented in which one of the plots represents a change in an average number of audience members for a selected time period, and the other of the two plots represents the change in the number of audience members during a time period being evaluated. The normalized data and various components thereof can be presented in an assortment of forms and formats.

Various embodiments also permit listening to or viewing songs, spots and other content associated with particular point along the time axis of the graph. In some embodiments, therefore, a user can listen to or view content on a second to second, minute to minute, hour to hour, or other basis, and observe the audience reactions, e.g: tune-in, tune-out; tune to another station (or other media outlet/source); and tune from another station.

As illustrated by block 550, a check can be made to determine if a user has elected to change any of the display parameters for the GUI. For example, a user may change the time of day using a filter pane or other user selectable object, so that different audience migration information is being considered, or so that the same audience migration information is being compared against different averages, means, or the like. Furthermore, a user may select a different time portion of a graph already being displayed, thereby causing information in an associated pane, e.g. a media log pane, to change. As illustrated by block 560, a GUI display can be changed to display data consistent with the newly entered user parameters.

Figure 6:
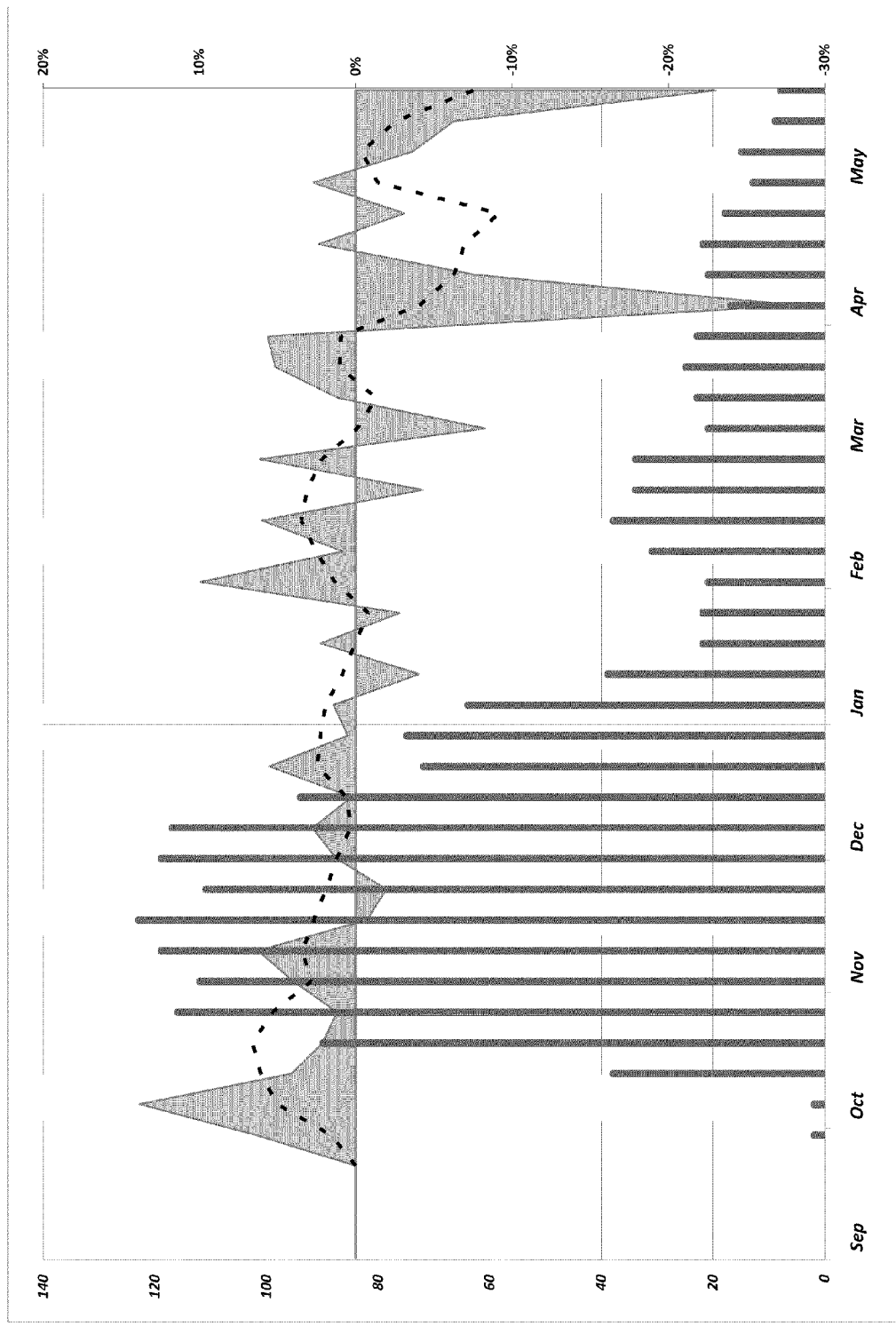
FIGS. 6 and 7 are graphs showing relationships between a number of audience members who switch, migrate, or tune-away from one or more stations and a number of audience members expected to do so, according to embodiments of the present disclosure.
Figure 7:
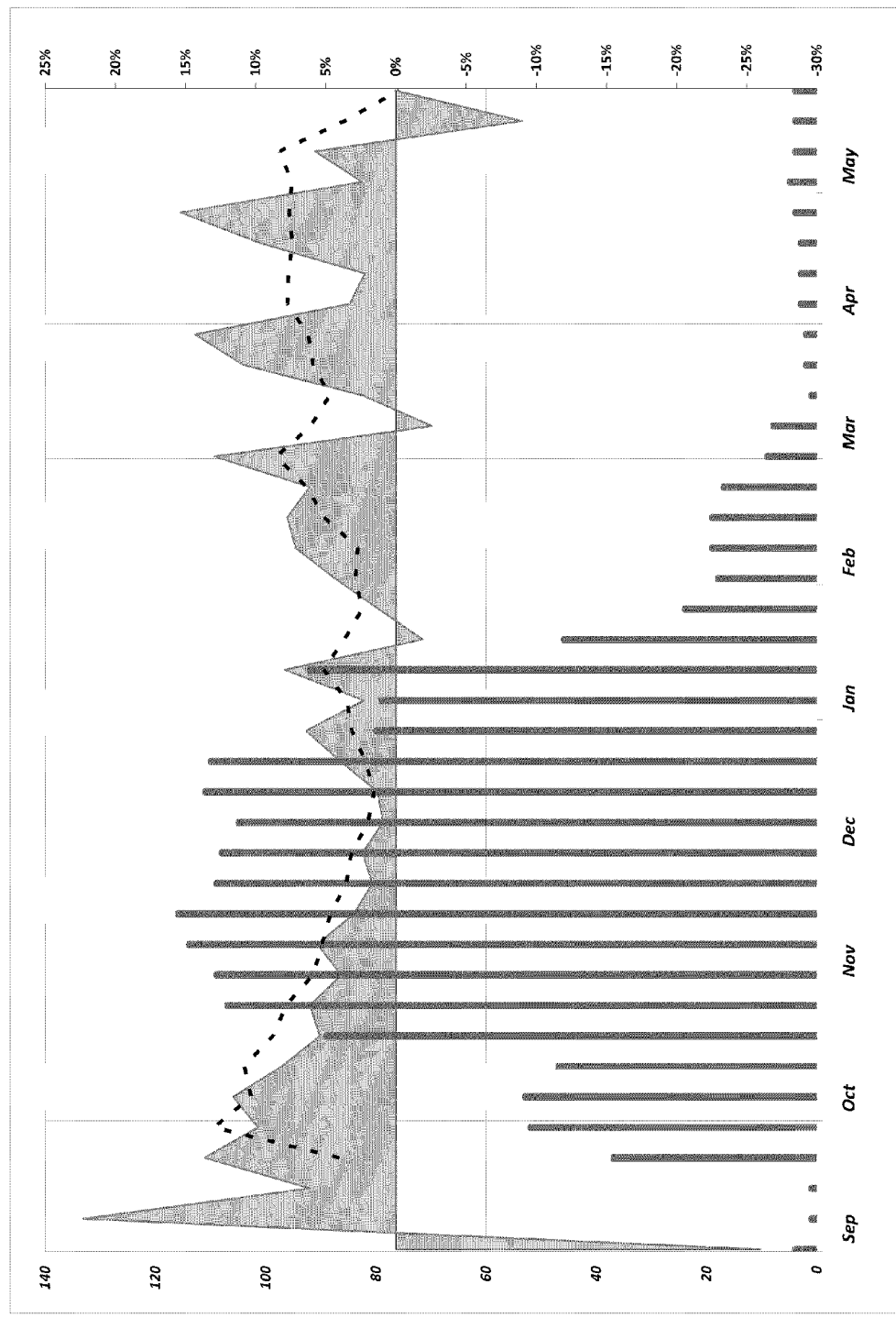

Referring next to FIGS. 6 and 7, graphs illustrating how data can be analyzed to determine migration information and charted for display on a GUI or other display device are illustrated. The numbers along the left $Y_1$ axis on the left side of graphs represent the number of times particular content, was aired during a given period of time. The time periods run along the X axis of the graphs. The numbers along the $Y_2$ axis on the right side of the graphs represent a percent value of audience members tuning away, or switching to a different station, with 0% representing an expected, or normalized, percentage of switches.

The data from Tables 1 and 2 are plotted in FIGS. 5 and 6, respectively, and illustrate the following.

1. Upper-half or positive area—less audience tune-out (more retained audience)
2. Lower-half or negative area—more audience tune-out (less retained audience)
3. Histogram—play count for the week
4. Dotted line—multi-week (e.g., 4 week) moving average
5. Flat line at 0%—average tune-out (normalized tune-out)

For example, assume a time period of 12:00 noon to 12:05 PM on a given day, and content-provider/market. During that period, various embodiments can perform the following:

a. determine the average number of audience participants (media consumers—e.g., listeners, viewers) switching in or out and tuning in or out at that time, during the presentation of the content being provided to the audience; and
b. look at this same time period of the day over a range of days and times during the week, across all months, and determine a value of switching or net audience over/under an average tune-out value for that period.

TABLE 1

|  | Airplay | Switching |
|---|---|---|
| Oct. 1, 2007 | 2 | 6.4% |
| Oct. 8, 2007 | 2 | 13.8% |
| Oct. 15, 2007 | 38 | 4.1% |
| Oct. 22, 2007 | 90 | 2.1% |
| Oct. 29, 2007 | 116 | 1.2% |
| Nov. 5, 2007 | 112 | 4.0% |
| Nov. 12, 2007 | 119 | 6.3% |
| Nov. 19, 2007 | 123 | −0.7% |
| Nov. 26, 2007 | 111 | −2.0% |
| Dec. 3, 2007 | 119 | 1.3% |
| Dec. 10, 2007 | 117 | 2.8% |
| Dec. 17, 2007 | 94 | 0.3% |
| Dec. 24, 2007 | 72 | 5.5% |
| Dec. 31, 2007 | 75 | 0.5% |
| Jan. 7, 2008 | 64 | 1.4% |
| Jan. 14, 2008 | 39 | −4.1% |
| Jan. 21, 2008 | 22 | 2.3% |
| Jan. 28, 2008 | 22 | −2.8% |
| Feb. 4, 2008 | 21 | 9.9% |
| Feb. 11, 2008 | 31 | 0.8% |
| Feb. 18, 2008 | 38 | 6.0% |
| Feb. 25, 2008 | 34 | −4.3% |
| Mar. 3, 2008 | 34 | 6.1% |
| Mar. 10, 2008 | 21 | −8.3% |
| Mar. 17, 2008 | 23 | 1.2% |
| Mar. 24, 2008 | 25 | 5.2% |
| Mar. 31, 2008 | 23 | 5.6% |
| Apr. 7, 2008 | 17 | −28.3% |
| Apr. 14, 2008 | 21 | −7.6% |
| Apr. 21, 2008 | 22 | 2.4% |
| Apr. 28, 2008 | 18 | −3.1% |
| May 5, 2008 | 13 | 2.7% |
| May 12, 2008 | 15 | −3.6% |
| May 19, 2008 | 9 | −6.3% |
| May 26, 2008 | 8 | −23.0% |

TABLE 2

|  | Airplay | Switching |
|---|---|---|
| Sep. 3, 2007 | 4 | −26.0% |
| Sep. 10, 2007 | 1 | 22.3% |
| Sep. 17, 2007 | 1 | 6.2% |
| Sep. 24, 2007 | 37 | 13.7% |
| Oct. 1, 2007 | 52 | 9.9% |
| Oct. 8, 2007 | 53 | 11.6% |
| Oct. 15, 2007 | 47 | 8.1% |
| Oct. 22, 2007 | 89 | 5.4% |
| Oct. 29, 2007 | 107 | 6.1% |
| Nov. 5, 2007 | 109 | 3.9% |
| Nov. 12, 2007 | 114 | 5.6% |
| Nov. 19, 2007 | 116 | 3.0% |
| Nov. 26, 2007 | 109 | 1.7% |
| Dec. 3, 2007 | 108 | 2.4% |
| Dec. 10, 2007 | 105 | 0.9% |
| Dec. 17, 2007 | 111 | 1.3% |
| Dec. 24, 2007 | 110 | 4.0% |
| Dec. 31, 2007 | 80 | 6.4% |

TABLE 2-continued

| | Airplay | Switching |
|---|---|---|
| Jan. 7, 2008 | 79 | 2.3% |
| Jan. 14, 2008 | 92 | 7.9% |
| Jan. 21, 2008 | 46 | −1.9% |
| Jan. 28, 2008 | 24 | 1.2% |
| Feb. 4, 2008 | 18 | 4.4% |
| Feb. 11, 2008 | 19 | 7.2% |
| Feb. 18, 2008 | 19 | 7.8% |
| Feb. 25, 2008 | 17 | 6.2% |
| Mar. 3, 2008 | 9 | 12.9% |
| Mar. 10, 2008 | 8 | −2.6% |
| Mar. 17, 2008 | 1 | 2.4% |
| Mar. 24, 2008 | 2 | 10.9% |
| Mar. 31, 2008 | 2 | 14.3% |
| Apr. 7, 2008 | 3 | 3.3% |
| Apr. 14, 2008 | 3 | 2.2% |
| Apr. 21, 2008 | 3 | 9.7% |
| Apr. 28, 2008 | 4 | 15.4% |
| May 5, 2008 | 5 | 2.4% |
| May 12, 2008 | 4 | 5.8% |
| May 19, 2008 | 4 | −9.0% |
| May 26, 2008 | 4 | 0.1% |

Using a log of content that has been presented to consumers, this same analysis may be performed for other plays of the same content over a period of time, which may be or may not be independent of the range of time mentioned above.

The trend information can be based, for example, on specified content play at a given station, market or other level as desired. Additionally, in various embodiments the data could also be used to represent advertising, promotions, and other content.

Various embodiments of the disclosure allow a content provider to determine the efficacy of their content relative to a target audience, and in some embodiments assign a ranking, rate or other performance factor to a particular item of content. Reporting this information, including in some cases the performance factor, to key users such as media companies, ad agencies, advertisers, promotion sponsors, and the like, can allow these key users to adjust their content to attract and/or retain more audience and therefore more advertising revenue.

Various embodiments described herein are directed to methods and systems for analyzing and trending audience tune-out by time, station, and market. Some embodiments integrate different data formats of an audience data provider service (e.g., Arbitron, Nielson, etc.) and a content data provider service (e.g., Media Monitors) to provide a unique analysis of the information that makes it more usable to broadcast and advertising personnel. That is, audience data is received from an audience data provider, for example Arbitron or Nielson, which provides the data related to what media a target audience is consuming at a given time. A content data provider service, for example, Media Monitors, can provide the instance of content information as to what media is played, and when and how frequently that particular media is played. In other embodiments, either or both of the audience and content data can be received from other sources or be generated as part of an implementation of the present disclosure. The above types of information are examples of information that can be processed to determine audience migration information.

As noted above, Tables 1 and 2 include examples of airplay data and switching percentages as might be determined according to embodiments of the present disclosure using audience data provider services and content data provider services.

Various embodiments of the present disclosure provide a way to integrate the instance of content information and media consumer data to provide an analysis of consumer switching to a more detailed level. In some embodiments involving radio or streaming audio, for each airplay, and the corresponding day and song play duration for that airplay within the data range, the average number of station switches is calculated. This method could easily be provided for other media content such as video, text, written content, television, internet, etc., other media content providers such as television stations and websites, and other consumers such as television viewers, internet users, or the like.

In at least one radio or streaming internet audio embodiment, for example, "Never too late" is played by Three Days Grace from Big Shiny Tunes Vol. 12 on Monday at 1:30 to 1:35 PM. For every Monday and each song play duration of 5 minutes at 1:30 to 1:35—for any song airplay at that day and time, method 800 can determine the Number of Switches that occurred, across the entire data range. Method 800 can calculate the average station switches as: Number of Switches divided by No. of days in data range=Station Average Switches for that day and time slot for any song on that station. Method 800 can also calculate the average station listeners as: Number of Listeners divided by No. of days in data range=Station Average Listeners for that day and time slot for any song on that station.

For example, using the data range provided in Table 1, there are 35 data points from Oct. 1, 2007 through May, 26, 2008. For week 35, May, 26, 2008, there are 8 airplays, so the method repeats the above steps for all 8 airplays of Three Days Grace from Big Shiny Tunes Vol. 12.

For each airplay in the period, the method performs the following:

a) Find the average song switches for the airplay by summing all of the switches for each minute of airplay of that song and divide by the duration of the song in minutes.

b) Find the average of the station average switches for the corresponding day and time slot by summing all of the station average switches for the day and time slot and dividing by the duration of the song in minutes.

c) Find the difference of the above two averages; by subtracting the average of the station average switches from the average song switches.

d) Find the percent difference (airplay switch percent) by dividing the result from the prior step by the average of the station average listeners for the week. That is, [(average of the song switches)−(average station average switches)]/(average of the station average listeners) *100*−1.

Based on these calculations, the resultant number (the switch percent assigned to an occurrence of content) is normalized against the expectation for that content provider at the time the content aired. If the average of the song switches is less than the average station average switches, then the resultant number is positive, meaning that more audience members were retained than expected. If the average of the song switches is equal to the average of the station average switches, then the resultant number is 0, meaning that retention is exactly what was expected. If the average of the song switches is greater than the average of the station average switches, then the resultant number is negative, which means that the audience retention is less than expected.

For all airplays of the same content from the same provider in the week (period), the method finds the average percent difference (switch percent) by summing all of the percent differences found in step (d) above and dividing by the number of times the content aired. That is, (sum(airplay switch percent))/(number of content airplays in the period).

If the resultant number is negative, then this indicates more switches occurred that week on average, and there was less retained audience. If the resultant number is positive, then it indicates fewer switches occurred that week on average, and there was more retained audience for the airplay overall that week.

Switch percentages are calculated at the given specified content instance level (Airplay Switch Percent) and at the content level (Switch Percent). The instance level refers to each given specified instance of the content within the period of time being analyzed. The content level refers to the aggregate of all instances of a given piece of content within period.

Airplay Switch Percent=

$$((PL.Consumers\_Switched\_Out) - (PL.Consumers\_Switched\_Out\_Avg))/(PL.LC\_Total\_Content\_Provider\_Avg)*100.00)*-1$$

WHERE
a. $PL.Consumers\_Switched\_Out$=The number of consumers who switched to another content provider during a given specified content instance in the period;
b. $PL.Consumers\_Switched\_Out\_Avg$=The average of the average number of consumers who switch to another content provider during the minutes of the day at which the given specified content instance played.
c. $PL.LC\_Total\_Content\_Provider\_Avg$=The average of average number of consumers who are tuned in to the content provider during the minutes of the day at which the given specified content instance played.
d. In some embodiments, the number of days used to derive the average number of consumers tuned in to a content provider or the average number of consumers who switch to another content provider is 91 days (13 weeks).

Switch Percent=

$$sum(Airplay\_Switch\_Percent)/(Instance\_Count)$$

WHERE
a. $Airplay\_Switch\_Percent$=The Airplay Switch Percentage calculated for a given specified content instance played
b. $Instance\_Count$=The number of specified content instances in the period.

Put another way, Airplay Switch Percent=((Reaction to the specified content each time it is an instance of content)−(normal reaction on this content provider at those times))/(normal audience on this content provider at those times). Switch Percent=the average Airplay Switch Percent for a given piece of content over a given period of time.

In some embodiments, a 4-week moving average is calculated as the sum of the prior 3 weeks and the current week then divided by 4.

The content provider's consumers who switch away while this specified content is being played is compared to the content provider's consumers who switch away at those same times of the day regardless of what is being played, and is expressed as a percentage of the content providers average audience at those times of day. This yields a "Normalized" percentage of consumers switched out during the play of the specified content being analyzed, in each period.

Switch Percent is the value plotted on the graphs shown in FIGS. 6 and 7. A positive number on the graphs of FIGS. 6 and 7, therefore, can indicate a positive audience reaction; a negative number is a negative reaction.

Figure 8:
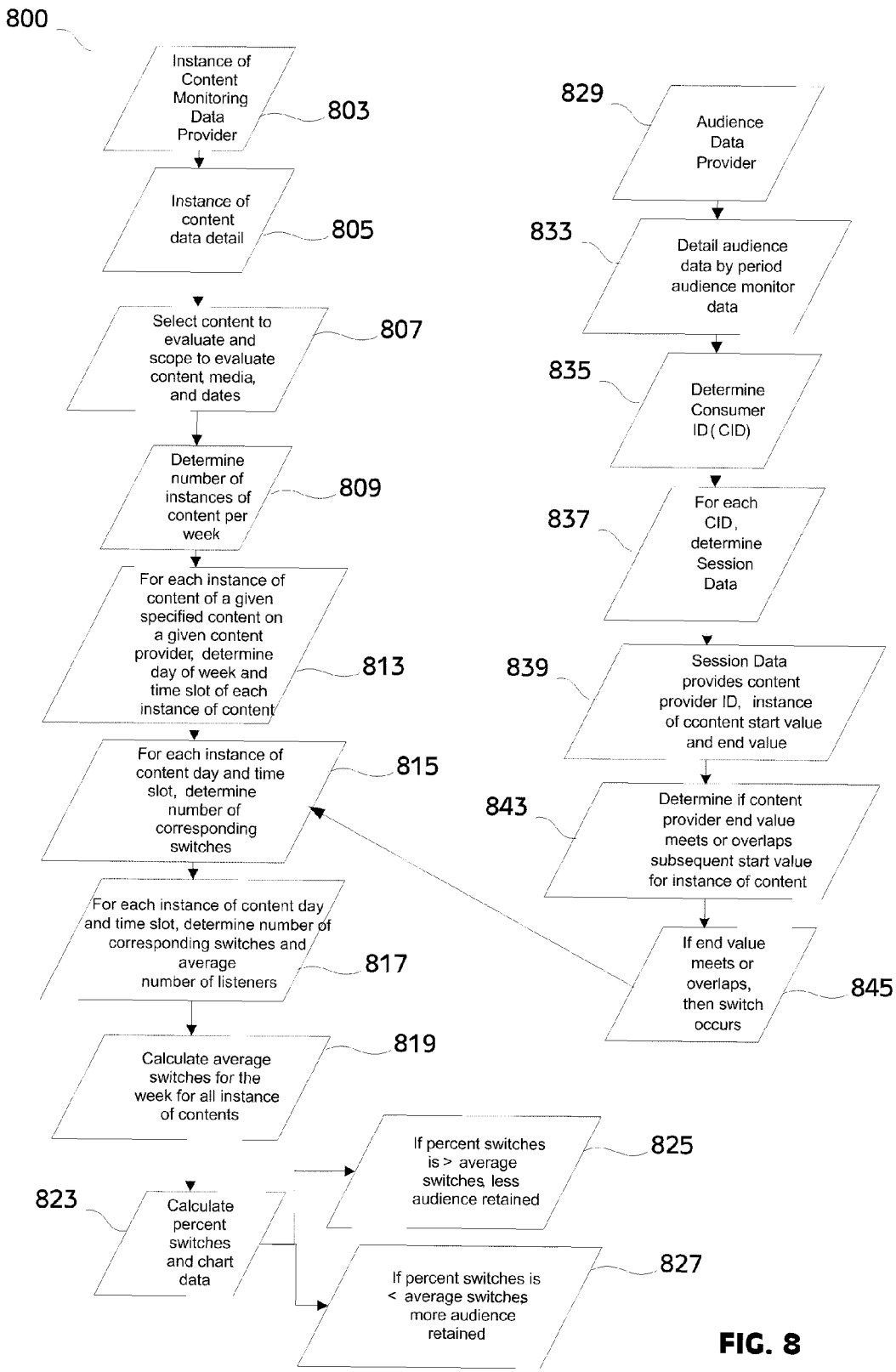
FIG. 8 is a flow chart illustrating a method of evaluating the number of audience members who switched to or from a station.

Referring now to FIG. 8, a method 800 is discussed according to various embodiments of the present disclosure. As illustrated by block 803, content data can be received from a content monitoring data provider. Particular instances of content data detail can be identified, as illustrated by block 805. These particular instances of content data detail can include, but are not limited to, information such as a station on which the content aired, a date of broadcast, the minutes of the day during which the instance of content aired, and the like.

As illustrated by block 807, particular content to be evaluated can be selected. For example a particular song, movie, program, advertisement, or other content can be selected for evaluation based on information contained in the content data detail or otherwise. As illustrated by block 809, the number of instances that particular content was broadcast over a desired evaluation period can be determined. In some embodiments, that time period can be a week, but other periods of evaluation can be selected as desired.

As illustrated by block 813, for each time the selected content aired on a particular station, the day of the week and time slot can be determined. It should be noted that in some embodiments, basing the evaluation on the day of the week is optional. In some instances, content that airs during selected hours, for instance between midnight and 4 am, may also be excluded from the calculations to reduce potential data skewing effects.

As illustrated by block 815, for each instance of content, day and time being considered, a number of corresponding switches can be determined. The number of corresponding switches may include only instances in which audience members tuned away from the station, or a net number of switches can be determined based on a number of both tune-in events and tune-away events.

Determining the number of switches that occur during the broadcast of particular content involves, in at least some embodiments, merging content data with audience data. As illustrated by block 829, audience data can be received from an audience data provider or other source. As illustrated by block 833, detailed audience data can be selected by period, but may in some instances be selected based on other criteria.

As illustrated by block 835, a consumer identifier associated with each record of audience data is determined in at least one embodiment. As further illustrated by block 837, for each consumer identifier, session data can be determined. Session data includes, but is not limited to, station identifiers, and start and end values, as illustrated by block 839. Thus the session data can be used to identify which station a particular audience member was tuned to at any particular time.

As illustrated by block 843, a determination can be made regarding whether a content provider end value meets or overlaps a subsequent start value for a particular instance of content. As shown by block 845, a switch occurs if an end value meets or overlaps with a subsequent start value, then a switch has occurred.

The presence or absence of a switch, as determined at block 845, can be used in conjunction with content data at block 815 to determine how many switches occurred during a particular instance of content. As illustrated at block 817, the average number of switches for a particular content provider at corresponding day and time slot can be calculated over the data range. In some embodiments, this average can be an expected number of switches. Thus, it can be determined that a particular station experiences an average number of switches every Monday at 4:01 pm, for example. It should be noted that in some embodiments, the day of the week is not factored into the determination of the average number of switches. So, for example, an average number of switches at 4:01 pm based on every day of the week can be determined. In further embodiments, weekends or weekdays can be treated separately or together, depending on a desired calculation.

As illustrated by block 819, an average number of switches for all instances of content aired during an evaluation period can be calculated. In the illustrated embodiment the evaluation period is a week, but other periods of time, for example a month, three weeks, or a year can be used.

As illustrated by block 823, a percentage of switches can be calculated, and charted. Furthermore, as illustrated by blocks 825 and 827, in some embodiments, a performance factor can be assigned based on a relationship between an expected number of switches and an actual number of switches. Block 825 illustrates that if the percentage of switches is greater than an average, or expected number of switches, less audience is retained. Block 827 illustrates that if the percentage of switches is less than the average, or expected number of switches, more audience is retained. A performance factor, in at least some embodiments, indicates whether more or less audience is retained. In some embodiments, a performance factor may include a degree to which more or less audience is retained.

Although much of the above discussion relates to analyzing and aggregating audience data from one or more media outlets for an instance of content on a particular station, similar techniques can be utilized for embodiments, aggregating audience data for an instance of a program across one or more media outlets. In some cases, applying the techniques described herein can deliver a larger audience sample, so that filters can be used without reducing reliability of the data.

The term "program," as used herein, generally refers to a series of content items grouped together by a schedule of airing times on one or more media outlets. In some cases, however, the term program can also refer to a single instance of content, and to groups of content items not necessarily arranged in a series.

The source of information to define a given program may include automated or manually entered data received from a content provider such as Media Monitors, data entered by end-users to define their own "custom" Program schedule, or some other suitable source.

Calculating Audience Reaction to a Program

According to at least one embodiment, the techniques described herein can be used to determine audience reaction to a program, e.g. audience migration information. For example, given the following inputs:

| Required in some embodiments: | |
|---|---|
| Program Id | Identifies which Program is to be reported |
| Day to Examine | The Date for which the Audience Reaction is to be evaluated |
| Start Date | Starting Date to use for determining Audience Reaction Averages |
| End Date | Ending Date to use for determining Audience Reaction Averages |
| Optional in some embodiments: | |
| Content Provider | Content Provider filter (e.g. Market, Broadcast TV, Cable TV, Network) |
| Days | Day of the week filter |
| In\Out of Home | In Home, Out of Home, All Panelists filter |
| Age Group | Age Group filter |
| Gender | Gender Filter |
| Race | (Not currently used) |
| Language | (Not currently used) |

The process will generate the following outputs:

| | |
|---|---|
| dailycount_average | The Average number of Consumers (e.g., Listeners, Watchers) per minute of the Program on the Day to Examine |
| dailycount_average_IH | The Average number of In-Home Consumers per minute of the Program on the Day to Examine |
| dailycount_average_OH | The Average number of Out-of-Home Consumers per minute of the Program on the Day to Examine |
| avgcount_average | The Average number of Consumers (e.g., Listeners, Watchers) per minute of the Program over the course of the Start Date through End Date range |
| avgcount_average_IH | The Average number of In-Home Consumers per minute of the Program over the course of the Start Date through End Date range |
| avgcount_average_OH | The Average number of Out-of_Home per minute of the Program over the course of the Start Date through End Date range |

For each Minute of the airing of the Program:

| | |
|---|---|
| Minute_Id | Minute offset into the Start of the program (in other words a value of 27 means the $27^{th}$ minute of the airing of the program) |
| Avg_Count | The Average number of Consumers (e.g., Listeners, Watchers) of the Program during Minute_Id over the course of the Start Date through End Date range |
| Avg_Count_IH | The Average number of In-Home Consumers of the Program during Minute_Id over the course of the Start Date through End Date range |
| Avg_Count_OH | The Average number of Out-of-Home Consumers of the Program during Minute_Id over the course of the Start Date through End Date range |

| | -continued |
|---|---|
| Event_Count | Actual number of Consumers of the Program at Minute_Id on the Day to Examine |
| Event_Count_IH | Actual number of In-Home Consumers of the Program at Minute_Id on the Day to Examine |
| Event_Count_OH | Actual number of Out-of_Home Consumers of the Program at Minute_Id on the Day to Examine |
| Diff_EventCount_AvgCount | The difference between Event_Count and Avg_Count |
| Diff_EventCount_AvgCount_IH | Event_Count_IH less Avg_Count_IH |
| Diff_EventCount_AvgCount_OH | Event_Count_OH less Avg_Count_OH |
| Tuned_In | The number of Consumers who Tuned In to a Station airing the Program at Minute_Id over the course of the Start Date through End Date range |
| Tuned_In_IH | The number of In-Home Consumers who Tuned In to a Station airing the Program at Minute_Id over the course of the Start Date through End Date range |
| Tuned_In_OH | The number of Out-of-Home Consumers who Tuned In to a Station airing the Program at Minute_Id over the course of the Start Date through End Date range |
| Tuned_Out | The number of Consumers who Tuned Away from a Station airing the Program at Minute_Id over the course of the Start Date through End Date range |
| Tuned_Out_IH | The number of In-Home Consumers who Tuned Away from a Station airing the Program at Minute_Id over the course of the Start Date through End Date range |
| Tuned_Out_OH | The number of Out-of-Home Consumers who Tuned Away from a Station airing the Program at Minute_Id over the course of the Start Date through End Date range |

In at least one embodiment, Average is calculated based on Start/End Date. In other embodiments, the Average can be calculated based on additional or different criteria to allow a user to choose another episode of the program or a similar program to compare against.

Additionally, the output of the process can include a list of the stations on which the program airs. These results can be used to generate various graphs and plots that may aid in the evaluation of audience responses to a program. The values can be computed as follows:

Using the Program_Id, retrieve the program schedule. The program schedule generally includes the stations on which the Program airs. For each station, the program schedule generally includes the days of the week and the start and end times of each airing.

Retrieve the PPM Event records which match the following criterion:
 a. Station is one of the stations on which the program airs;
 b. Event Date is within the requested Start and End Date range and\or is equal to the requested Day to Examine (which may or may not be within the Start through End Date range);
 c. The Event Date is on a day of the week on which the Program airs on the Station;
 d. The Event Date is on a day of the week which matches the Days filter parameter, if any;
 e. The Event Time is within the Start and End time of the program on each Station;
 f. The Consumer's (Panelist) Demographics match the requested demographic parameters, if any (e.g., Age, Gender); and
 g. The Event In-Home\Out-of-Home indicator matches the In\Out of Home filter parameter, if any.

Each Event record thus retrieved can represent exactly one consumer and exactly one minute of consumption on one of the stations during the airing of the program. Each Event record can also contain an indication of whether the Consumer was In-Home or Out-of-Home at the time of consumption.

In various embodiments, the exact minute within the airing of the program is identified by the Minute_Id data element. For example, if a 3 hour Program begins to air at 10:00 AM on Station 1 and the Event time is 12:17 PM, then the Minute_Id can have a value of 137. If, on Station 2, the Program begins to air at 9:00 AM and the Event time is 11:17 AM, the Minute_Id for that Event record will also be 137. In this way, the Minute_Id represents the offset in Minutes from the beginning of the Program on each Station.

Tune Ins and Tune Outs can be determined on a minute-by-minute basis. A Tune In occurs when a given Consumer has an Event record for a given station in one minute for which they did not have an event record in the previous minute. A Tune Out occurs when a given Consumer has an event record for a given station in one minute for which they do not have an event record in the next minute.

It is possible for a given Consumer to have event records for more than one station for the same minute (date and time). These are "overlapping" event records. In some embodiments, before the number of Tune Ins and Tune Outs is computed, the overlapping event records are eliminated to avoid incorrect counts. Overlapping event records can be handled in the following manner:
 a. For each Minute where a Panelist is credited with more than one Station, if at least one of them is a Station on which the Program airs, eliminate from consideration those Event record(s) of that Minute where Station_id is not a station on which the Program airs
 b. This is an overlapping record which indicates that the consumer did not Tune In to or Tune Out of the station airing the program at that minute. Instead, in some embodiments, the consumer can be credited for being tuned in to that station and some other Station(s) during that same minute. In some such cases, the consumer will be counted for the station airing the Program and ignored for the other Stations.
 c. For each Minute where a Panelist is credited with more than one Station, if none of the Stations is one on which the Program airs eliminate all but one of the Event record(s) of that Minute.

This process can be performed for each minute of the Airing of the program on the Day to Examine (Event Date=Day to Examine parameter). Once the overlapping Event records are eliminated, a proper counting of Tune Ins and Tune Outs per minute can be done.

Having gathered all of the above data, the following results can be computed:

The following can be computed for the overall duration of the program:

| Data Element | Computed as |
| --- | --- |
| dailycount_average | Count of the number of Event records where the Event Date equals the Day to Examine divided by the number of minutes in the Program |
| dailycount_average_IH | Count of the number of Event records where the Event Date equals the Day to Examine and the In-Home indicator equals 1 divided by the number of minutes in the Program |
| dailycount_average_OH | Count of the number of Event records where the Event Date equals the Day to Examine and the Out-of-Home indicator equals 1 divided by the number of minutes in the Program |
| avgcount_average | Count of the number of Event records divided by the number of minutes in the Program |
| avgcount_average_IH | Count of the number of Event records where In-Home indicator equals 1 divided by the number of minutes in the Program |
| avgcount_average_OH | Count of the number of Event records where the Out-of-Home indicator equals 1 divided by the number of minutes in the Program |

The following can be computed for each minute of the airing of the Program:

| | |
| --- | --- |
| Minute_Id | A value from 0 through the duration of the Program in Minutes (A three hour program will return data for Minute_Id 0 through 180. A value of 27 means the $27^{th}$ minute of the airing of the program) |
| Avg_Count | The Average number of Consumers (e.g., Listeners, Watchers) of the Program during Minute_Id over the course of the Start Date through End Date range |
| Avg_Count_IH | The Average number of In-Home Consumers of the Program during Minute_Id over the course of the Start Date through End Date range |
| Avg_Count_OH | The Average number of Out-of-Home Consumers of the Program during Minute_Id over the course of the Start Date through End Date range |
| Event_Count | Actual number of Consumers of the Program at Minute_Id on the Day to Examine |
| Event_Count_IH | Actual number of In-Home Consumers of the Program at Minute_Id on the Day to Examine |
| Event_Count_OH | Actual number of Out-of_Home Consumers of the Program at Minute_Id on the Day to Examine |
| Diff_EventCount_AvgCount | Event_Count-Avg_Count |
| Diff_EventCount_AvgCount_IH | Event_Count_IH-Avg_Count_IH |
| Diff_EventCount_AvgCount_OH | Event_Count_OH-Avg_Count_OH |
| Tuned_In | Count one Tune In for each instance where a given Consumer has an Event record for a Station on which the Program airs in Minute_Id for which they do not have an Event record for that Station in Minute_Id − 1. |
| Tuned_In_IH | If the above Event record has an In-Home indicator value of 1, then count it as an In-Home Tune In |
| Tuned_In_OH | If the above Event record has an In-Home indicator value of 6, then count it as an Out-Of-Home Tune In |
| Tuned_Out | Count one Tune Out for each instance where a given Consumer has an Event record for a Station on which the Program airs in Minute_Id − 1 for which they do not have an Event record for that Station in Minute_Id |
| Tuned_Out_IH | If the above Event record has an In-Home indicator value of 1, then count it as an In-Home Tune Out |
| Tuned_Out_OH | If the above Event record has an In-Home indicator value of 6, then count it as an Out-Of-Home Tune Out |

Figure 9:
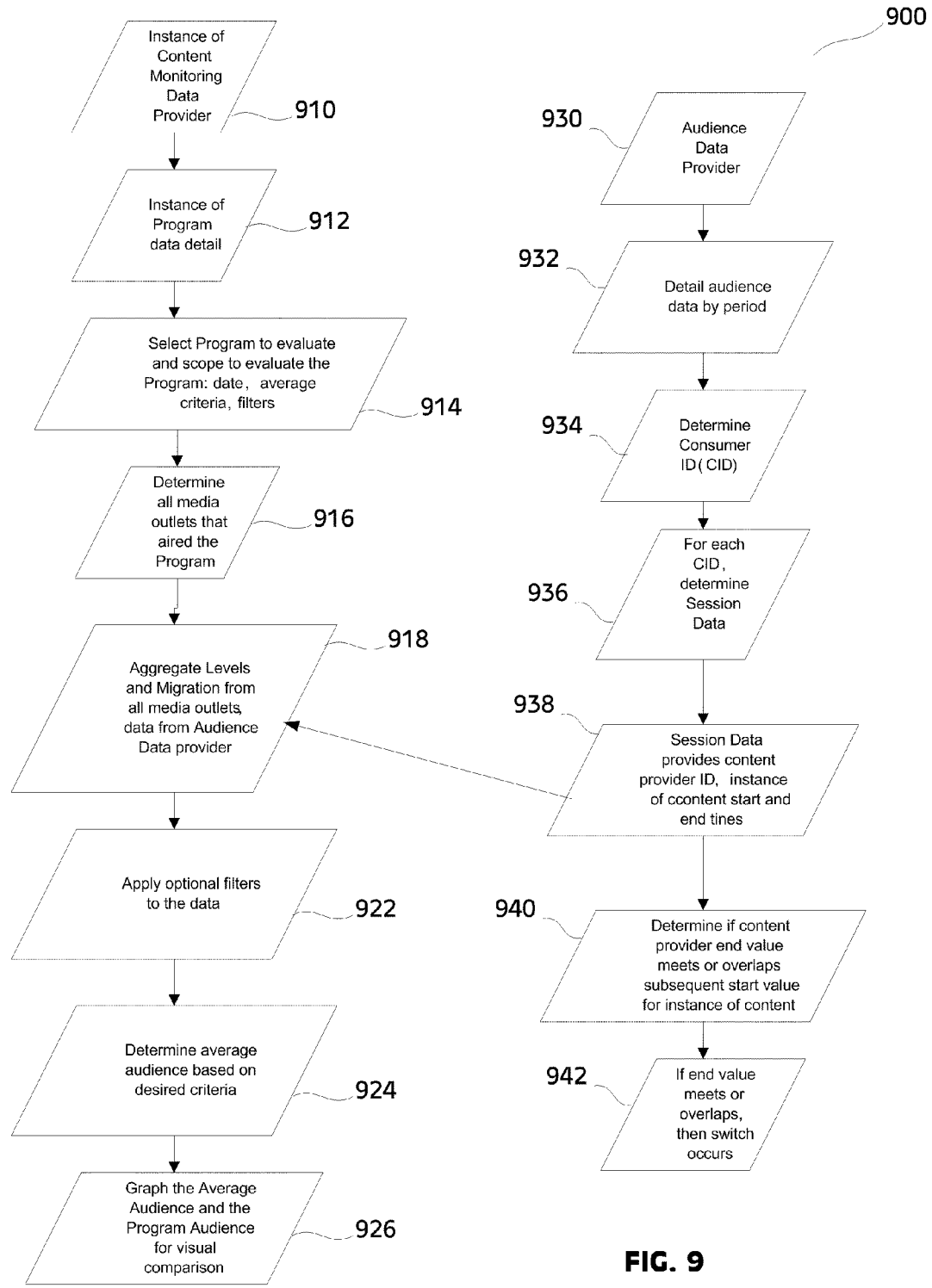
FIG. 9 is a flow chart illustrating a method of presenting audience and program information for visual comparison.

Referring now to FIG. 9, a flowchart illustrating an embodiment of a method 900 for analyzing program audience reaction. As illustrated by block 910, information can be received from a content monitoring data provider. As illustrated by block 912, detailed data regarding instances of programs can be input or received. In some embodiments, the information received from a content monitoring data provider may include automatically determined program airplay dates and times calculated from schedule information or live, playing information.

As illustrated by block 914, the program to be evaluated can be selected, and the scope of the evaluation chosen. For example, the date to be evaluated, which average criteria to consider, and any data filters are to be applied can be selected. As illustrated by block 916, the media outlets that aired the program are determined. As illustrated by block 918, levels and switching from all media outlets airing the program can be aggregated based on data received from an audience data provider.

As illustrated by block 922, if filters were chosen, they can be applied to the aggregated data. The average audience can be determined based on the desired and chosen average criteria, as illustrated by block 924. As illustrated by block 926, the average audience and program audience can be graphed for visual comparison.

As illustrated by block 930 audience data can be received from an audience data provider. As illustrated by block 932, the received data can be detailed audience data by period. As illustrated by block 934, a consumer identifier (CID) associated with particular audience data can be identified. And as illustrated by block 936, for each CID, session data can be determined. As illustrated by block 938, session data can include a CID, Media Outlet (content provider ID), Date, Start/End Time for a single listening/viewing instance, which falls within a given monitoring period. As illustrated by block 918, the session data can be used to determine the aggregation of levels and switching from multiple media outlets.

As illustrated by block 940, switching events can be analyzed to determine if content provider end values met or overlapped subsequent start value for the instance of content. As illustrated by block 942, if the end value meets or overlaps, then a switch is determined to have occurred.

In some embodiments, the audience reaction can be calculated and graphed without regard to the media Program. In some such embodiments, the Audience Reaction for a given Content Provider (or filtered list of providers) throughout each minute of the day, regardless of the content being aired, is calculated and graphed.

Figure 10:
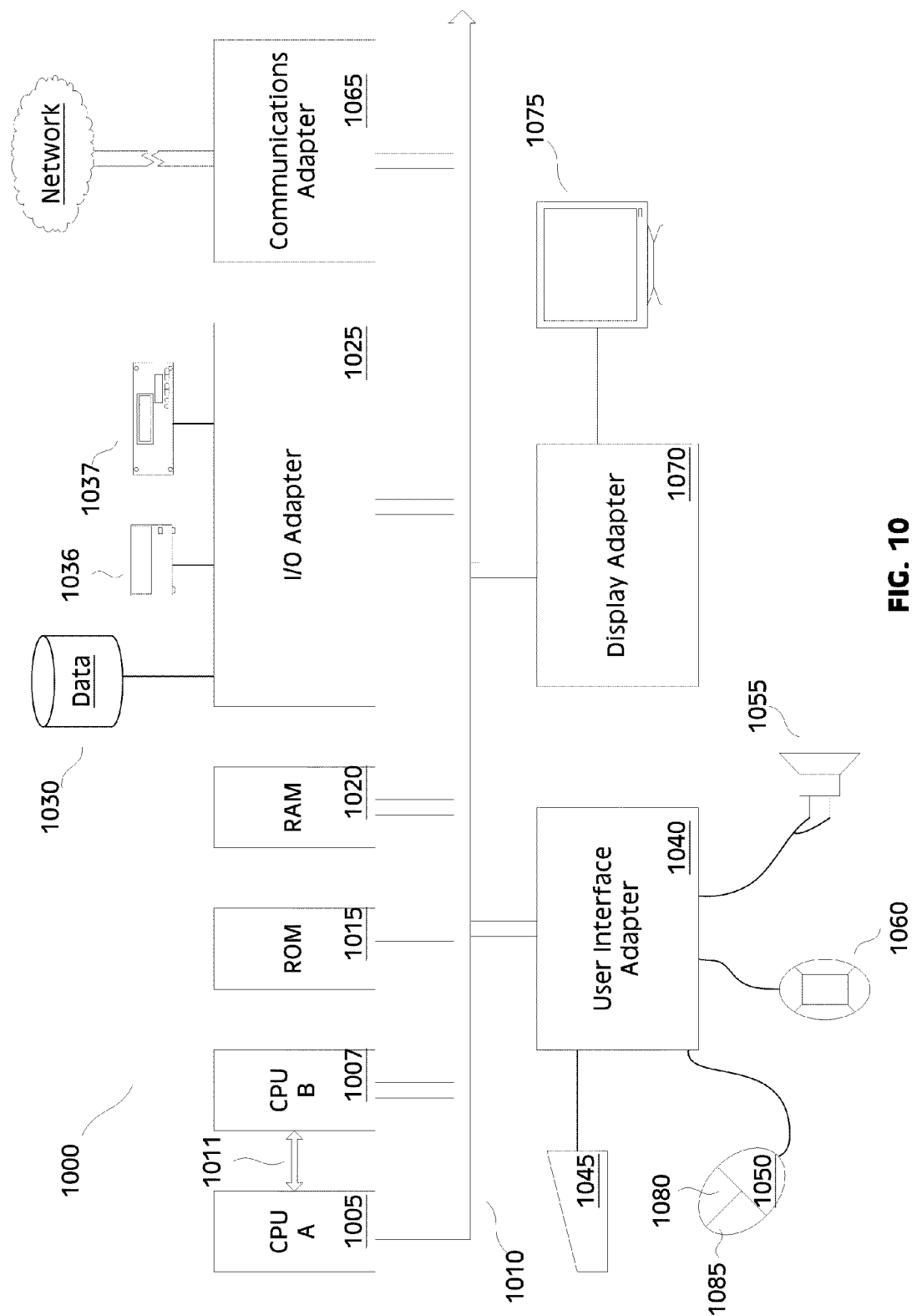
FIG. 10 is a high level block diagram of a processing system according to embodiments of the present disclosure.

Some or all of the methods and processes described herein can be embodied in or performed by one or more processing systems. An example of such a processing system is discussed with reference to FIG. 10. Processing system 1000 includes one or more central processing units, such as CPU A 1005 and CPU B 1007, which may be conventional microprocessors interconnected with various other units via at least one system bus 1010. CPU A 1005 and CPU B 1007 may be separate cores of an individual, multi-core processor, or individual processors connected via a specialized bus 1011. In some embodiments, CPU A 1005 or CPU B 1007 may be a specialized processor, such as a graphics processor, other co-processor, or the like.

Processing system 1000 includes random access memory (RAM) 1020; read-only memory (ROM) 1015, wherein the ROM 1015 could also be erasable programmable read-only memory (EPROM) or electrically erasable programmable read-only memory (EEPROM); and input/output (I/O) adapter 1025, for connecting peripheral devices such as disk units 1030, optical drive 1036, or tape drive 1037 to system bus 1010; a user interface adapter 1040 for connecting keyboard 1045, mouse 1050, speaker 1055, microphone 1060, or other user interface devices to system bus 1010; communications adapter 1065 for connecting processing system 1000 to an information network such as the Internet or any of various local area networks, wide area networks, telephone networks, or the like; and display adapter 1070 for connecting system bus 1010 to a display device such as monitor 1075. Mouse 1050 has a series of buttons 1080, 1085 and may be used to control a cursor shown on monitor 1075. Monitor 1075 can be used to display a graphical user interface (GUI), implemented by a program of instructions executed by either or both of CPU A 1005 and CPU B 1007.

It will be understood that processing system 1000 may include other suitable data processing systems without departing from the scope of the present disclosure. For example, processing system 1000 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

The previous detailed description of embodiments of the disclosure depicted in the accompanying drawings. The embodiments are in such detail as to clearly communicate the disclosure. However, the amount of detail offered is not intended to limit variations of the described embodiments; on the contrary, the intention is to cover all modifications, equivalents, and alternatives falling within the spirit and scope of the present disclosure as defined by the appended claims.

What is claimed is:

1. A method comprising:
   receiving, at a server machine, audience data from an audience data provider, wherein the audience data includes consumer identifiers;
   determining session data associated with particular consumer identifiers;
   receiving, at the server machine, content data from a content data provider;
   integrating the audience data and the content data to determine audience migration information based, at least in part, on the session data, wherein the audience migration information includes:
      first information indicating a number of audience members who switched to a station from an initial station during an interval of time, and
      second information indicating a number of audience members who switched away from the station to a subsequent station during the interval of time;
   transmitting the audience migration data from the server machine to an end-user machine, wherein the end-user machine is configured to display a graphical representation of at least a portion of the audience migration information, by executing a program instruction in a computer system; and
   wherein displaying the graphical representation includes displaying a graph including both a first plot representing a relationship between the number of audience members who switched to a station during a period of time and a total number of audience members and a second plot representing a relationship between the number of audience members who switched away from the station during the period of time and the total number of audience members, by executing a program instruction in a computer system.

2. The method of claim 1, further comprising:
   displaying a graph including all of a first plot representing the number of audience members who switched to a station, a second plot representing the number of audience members who switched away from the station, and a third plot representing a number of audience members, by executing a program instruction in a computer system.

3. The method of claim 1, further comprising:
displaying a media log pane including a broadcast time for each of a plurality of programs played on the station during the interval of time in conjunction with the graphical representation, by executing a program instruction in a computer system.

4. A system comprising:
a processor;
memory associated with the processor; and
a program of instructions to be stored in the memory and executed by the processor, the program of instructions including:
at least one instruction to receive, at a server machine, audience data from an audience data provider, wherein the audience data includes consumer identifiers;
at least one instruction to determine session data associated with particular consumer identifiers;
at least one instruction to receive, at the server machine, content data from a content data provider;
at least one instruction to integrate the audience data and the content data to determine audience migration information based at least in part on the session data, wherein the audience migration information includes first information indicating a number of audience members who switched to a station from an initial station during an interval of time, and second information indicating a number of audience members who switched away from the station to a subsequent station during the interval of time;
at least one instruction to display a graphical representation of at least a portion of the audience migration information; and
at least one instruction to display a graph including a first plot representing a number of audience members who switched to a station, a second plot representing a number of audience members who switched away from the station, and a third plot representing a number of audience members.

5. The system of claim 4, further comprising:
at least one instruction to display a graph including a first plot representing a relationship between the number of audience members who switched to a station during a period of time and a number of audience members, and a second plot representing a relationship between the number of audience members who switched away from the station during the period of time and the number of audience members.

6. A method comprising:
receiving, at a server machine, audience data from an audience data provider, wherein the audience data includes consumer identifiers;
determining session data associated with particular consumer identifiers;
receiving, at the server machine, content data from a content data provider;
integrating the audience data and the content data to determine based, at least in part on the session data, first audience migration information and second audience migration information, the first audience migration information suggesting a rate of change in a number of audience members over a first interval of time during a first one or more days, by executing a program instruction in a computer system, the second audience migration information suggesting a rate of change in an average number of audience members over the first interval of time during a second one or more days, by executing a program instruction in a computer system;
generating normalized audience migration information illustrating a difference between the rate of change in the number of audience members over the first time interval during the first one or more days and the rate of change in the average number of audience members over the first time interval during the second one or more days; and
transmitting the normalized audience migration information from the server machine to an end-user machine, wherein the end-user machine is configured to display a graphical representation of at least a portion of the audience migration information.

7. The method of claim 6, further comprising:
transmitting the first audience migration information and the second audience migration information to a networked computer system, by executing a program instruction in a computer system; and
generating the normalized audience migration information at the networked computer system, by executing a program instruction in a computer system.

8. The method of claim 6, further comprising:
transmitting the first audience migration information, the second audience migration information, and the normalized audience migration information to a networked computer system for display, by executing a program instruction in a computer system; wherein
the normalized audience migration information is to be displayed by the networked computer system as a plot on a graph.

9. The method of claim 8, wherein the first audience migration information is to be displayed as a first plot on the graph, the second audience migration information is to be displayed as a second plot on the graph, and the normalized audience migration information is to be displayed as a third plot on the graph.

10. A system comprising:
a processor;
memory associated with the processor; and
a program of instructions to be stored in the memory and executed by the processor, the program of instructions including:
at least one instruction to receive, at a server machine, audience data from an audience data provider, wherein the audience data includes consumer identifiers;
at least one instruction to determine session data associated with particular consumer identifiers;
at least one instruction to receive, at the server machine, content data from a content data provider;
at least one instruction to integrate the audience data and the content data to determine based, at least in part on the session data, first audience migration information and second audience migration information, the first audience migration information suggesting a rate of change in a number of audience members over a first interval of time during a first one or more days, the second audience migration information suggesting a rate of change in an average number of audience members over the first interval of time during a second one or more days;
at least one instruction to generate normalized audience migration information indicating a difference between the rate of change in the number of audience members over the first time interval during the first one or more days and the rate of change in the average number of audience members over the second time interval during the second one or more days; and at least one instruction to transmit the normalized audience migration information from the server machine to an end-user machine, wherein the end-user machine is configured to display a graphical representation of at least a portion of the audience migration information.

11. The system of claim 10, further comprising:

at least one instruction to transmit the first audience migration information and the second audience migration information to a networked computer system, by executing a program instruction in a computer system; and at least one instruction to generate the normalized audience migration information at the networked computer system.

12. The system of claim 10, further comprising:

at least one instruction to transmit the first audience migration information, the second audience migration information, and the normalized audience migration information to a networked computer system for display; wherein the normalized audience migration information is to be displayed by the networked computer system as a plot on a graph.

13. The system of claim 12, wherein the first audience migration information is to be displayed as a first plot on the graph, the second audience migration information is to be displayed as a second plot on the graph, and the normalized audience migration information is to be displayed as a third plot on the graph.

* * * * *